United States Patent
Bohl et al.

(10) Patent No.: US 12,080,284 B2
(45) Date of Patent: Sep. 3, 2024

(54) TWO-WAY IN-VEHICLE VIRTUAL PERSONAL ASSISTANT

(71) Applicant: HARMAN INTERNATIONAL INDUSTRIES, INCORPORATED, Stamford, CT (US)

(72) Inventors: Gregory Bohl, Muenster, TX (US); Mengling Hettinger, Murphy, TX (US); Prithvi Kambhampati, Dallas, TX (US); Behrouz Saghafi Khadem, Dallas, TX (US); Nikhil Patel, Plano, TX (US)

(73) Assignee: Harman International Industries, Incorporated, Stamford, CT (US)

( * ) Notice: Subject to any disclaimer, the term of this patent is extended or adjusted under 35 U.S.C. 154(b) by 697 days.

(21) Appl. No.: 16/726,216

(22) Filed: Dec. 23, 2019

(65) Prior Publication Data

US 2020/0211553 A1      Jul. 2, 2020

Related U.S. Application Data

(60) Provisional application No. 62/786,247, filed on Dec. 28, 2018.

(51) Int. Cl.
*G10L 15/22*    (2006.01)
*G05D 1/00*     (2024.01)
(Continued)

(52) U.S. Cl.
CPC ............ *G10L 15/22* (2013.01); *G05D 1/0061* (2013.01); *G05D 1/0223* (2013.01); *G10L 13/00* (2013.01);
(Continued)

(58) Field of Classification Search
CPC .............. B60R 16/0373; B60W 10/18; B60W 2420/00; B60W 30/14; B60W 50/14;
(Continued)

(56) References Cited

U.S. PATENT DOCUMENTS 10,090,000 B1 * 10/2018 Tzirkel-Hancock ... H04R 1/028
10,785,562 B1 *  9/2020 Weekly .................. G10L 15/22
(Continued)

FOREIGN PATENT DOCUMENTS

CN      105807762 A      7/2016
CN      105895095 A      8/2016
(Continued)

OTHER PUBLICATIONS

Partial European Search Report for application No. 19220069.9 dated Mar. 5, 2020.
(Continued)

*Primary Examiner* — Daniel C Washburn
*Assistant Examiner* — Athar N Pasha
(74) *Attorney, Agent, or Firm* — Artegis Law Group, LLP

(57) ABSTRACT

One or more embodiments include a virtual personal assistant module executing on a virtual personal assistant system. The virtual personal assistant module obtains first sensor data from a first sensor included in a plurality of sensors. The virtual personal assistant module analyzes the first sensor data to generate a first result. The virtual personal assistant module obtains second sensor data from a second sensor included in the plurality of sensors. The virtual personal assistant module analyzes the second sensor data and the first result to generate a second result. The virtual personal assistant module outputs a natural language audio output to the user based on the second result.

20 Claims, 9 Drawing Sheets

(51) Int. Cl.
*G10L 13/00* (2006.01)
*G10L 15/18* (2013.01)
*G10L 15/26* (2006.01)
*G10L 15/30* (2013.01)

(52) U.S. Cl.
CPC .............. *G10L 15/26* (2013.01); *G10L 15/30* (2013.01); *G10L 15/1822* (2013.01)

(58) Field of Classification Search
CPC ............ B60Y 2300/14; B60Y 2400/30; G05D 1/0061; G05D 1/0223; G05D 2201/0213; G06F 3/011; G06F 3/167; G06F 40/35; G10L 13/00; G10L 13/027; G10L 13/08; G10L 15/1822; G10L 15/22; G10L 15/26; G10L 15/30; G10L 2015/223; G10L 2015/225
See application file for complete search history.

(56) References Cited

U.S. PATENT DOCUMENTS

| | | | |
|---|---|---|---|
| 10,789,943 B1* | 9/2020 | Lapshina ............ G10L 15/1815 |
| 2010/0332648 A1* | 12/2010 | Bohus .................... G06Q 10/10 | 709/224 |
| 2014/0106734 A1* | 4/2014 | Lee ......................... H04W 8/24 | 455/419 |
| 2014/0136013 A1 | 5/2014 | Wolverton et al. |
| 2014/0310002 A1 | 10/2014 | Nitz et al. |
| 2015/0088514 A1* | 3/2015 | Typrin .................... G10L 17/00 | 704/231 |
| 2016/0063989 A1 | 3/2016 | Deleeuw |
| 2016/0379107 A1* | 12/2016 | Li ........................ B25J 11/0005 | 706/11 |
| 2017/0160813 A1 | 6/2017 | Divakaran et al. |
| 2018/0120837 A1* | 5/2018 | Regmi ..................... A61B 5/01 |
| 2018/0173971 A1* | 6/2018 | Jia ........................... G06F 18/25 |
| 2018/0260680 A1* | 9/2018 | Finkelstein .............. G06N 5/04 |
| 2019/0025773 A1* | 1/2019 | Yang ..................... G06F 18/214 |
| 2019/0031174 A1* | 1/2019 | Adachi ............... B60W 30/181 |
| 2020/0105120 A1* | 4/2020 | Werner .................. G08B 25/006 |
| 2020/0183989 A1* | 6/2020 | Krogh .................... G06F 16/55 |

FOREIGN PATENT DOCUMENTS

| | | | | |
|---|---|---|---|---|
| CN | 108027664 A | 5/2018 | | |
| CN | 108701457 A | 10/2018 | | |
| DE | 10 2012 022630 A1 | 6/2013 | | |
| EP | 3057091 A1 * | 8/2016 | ............ B60W 40/09 |
| JP | 2017-156511 A | 9/2017 | | |

OTHER PUBLICATIONS

Extended European Search Report for application No. 19220069.9 dated Jun. 24, 2020.

* cited by examiner

TWO-WAY IN-VEHICLE VIRTUAL PERSONAL ASSISTANT

CROSS-REFERENCE TO RELATED APPLICATIONS

This application claims the benefit of United States provisional patent application titled "Two-Way In-Vehicle Virtual Personal Assistant," filed on Dec. 28, 2018 and having Ser. No. 62/786,247. The subject matter of this related application is hereby incorporated herein by reference.

BACKGROUND

Field of the Embodiments of the Present Disclosure

Embodiments of the present invention relate generally to computing devices and, more specifically, to a two-way virtual personal assistant.

Description of the Related Art

Virtual personal assistants (or "VPAs") have recently increased in popularity. In particular, demand for devices equipped with virtual personal assistant capability has grown, due at least in part to the capability of these devices to perform various tasks and fulfill various requests according to user direction. In a typical application, a virtual personal assistant is employed in conjunction with a vehicle. The user initiates an operation by uttering a special word or command to "wake up" the virtual personal assistant. The virtual personal assistant indicates readiness to perform an operation via a speech output or other indicator. The user then interacts with the virtual personal assistant to perform an operation, such as initiate a phone call, begin a navigation sequence, or play a music track.

One drawback with conventional virtual personal assistants, however, is that the virtual personal assistant is passive, relying on the user to initiate operations with a request or command. As a result, the virtual personal assistant is generally non-functional and idle during periods when the user is not requesting an operation. Another drawback is that conventional virtual personal assistants have little to no access to sensor data and other information resources, such as sensors located within the passenger compartment and external to the vehicle. Therefore, conventional virtual personal assistants have limited capability for performing operations and conveying insight and information to the user(s).

As the foregoing illustrates, what is needed in the art are more effective techniques for interacting with virtual personal assistants.

SUMMARY

Various embodiments of the present disclosure set forth a computer-implemented method for interacting with a user. The method includes obtaining first sensor data from a first sensor included in a plurality of sensors. The method further includes analyzing the first sensor data to generate a first result. The method further includes obtaining second sensor data from a second sensor included in the plurality of sensors. The method further includes analyzing the second sensor data and the first result to generate a second result. The method further includes outputting a natural language audio output to the user based on the second result.

Other embodiments include, without limitation, a computing device that implements one or more aspects of the disclosed techniques, and a computer readable medium including instructions for performing one or more aspects of the disclosed techniques.

At least one technical advantage of the disclosed techniques relative to the prior art is that the disclosed techniques enable a virtual personal assistant to continuously monitor sensor data and other data sources and, in response, to proactively notify a user of certain conditions based on this data. Another advantage of the disclosed techniques is that, because the virtual personal assistant has access to a rich variety of sensor data and other data sources, the virtual personal assistant generates notifications with improved accuracy and thoroughness relative to conventional approaches. These technical advantages represent one or more technological advancements over prior art approaches.

BRIEF DESCRIPTION OF THE SEVERAL VIEWS OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

As further described herein, a two-way virtual personal assistant system enables a user to interact with a virtual personal assistant to obtain information about an area, such as a vehicle and the surrounding environment or a home and the surrounding environment, monitored by one or more sensors. In assistant-to-user interactions, the two-way virtual personal assistant detects one or more states in the area monitored by the sensors and alerts the user regarding the detected states. More specifically, the virtual personal assistant module receives sensor data from one or more sensors and determines a state based on the sensors data. The virtual personal assistant module automatically generates an output, such as natural language speech output, based on the state (e.g., if the state is abnormal, if the state exceeds a threshold, etc.).

In user-to-assistant interactions, the virtual personal assistant receives a speech event via one or more microphones. The virtual personal assistant determines a request based on the speech event and determines a response to the request based on sensor data obtained from one or more sensors. The virtual personal assistant further generates an output, such as natural language speech output, based on the response to the request.

System Overview

In the descriptions of FIGS. 1-9, embodiments of the virtual personal assistant are generally described with respect to a vehicle-based environment. However, it is understood that the various embodiments of the virtual personal assistant may be used with other environments of interest, such as a home environment, an office environment, and/or the like.

Figure 1:
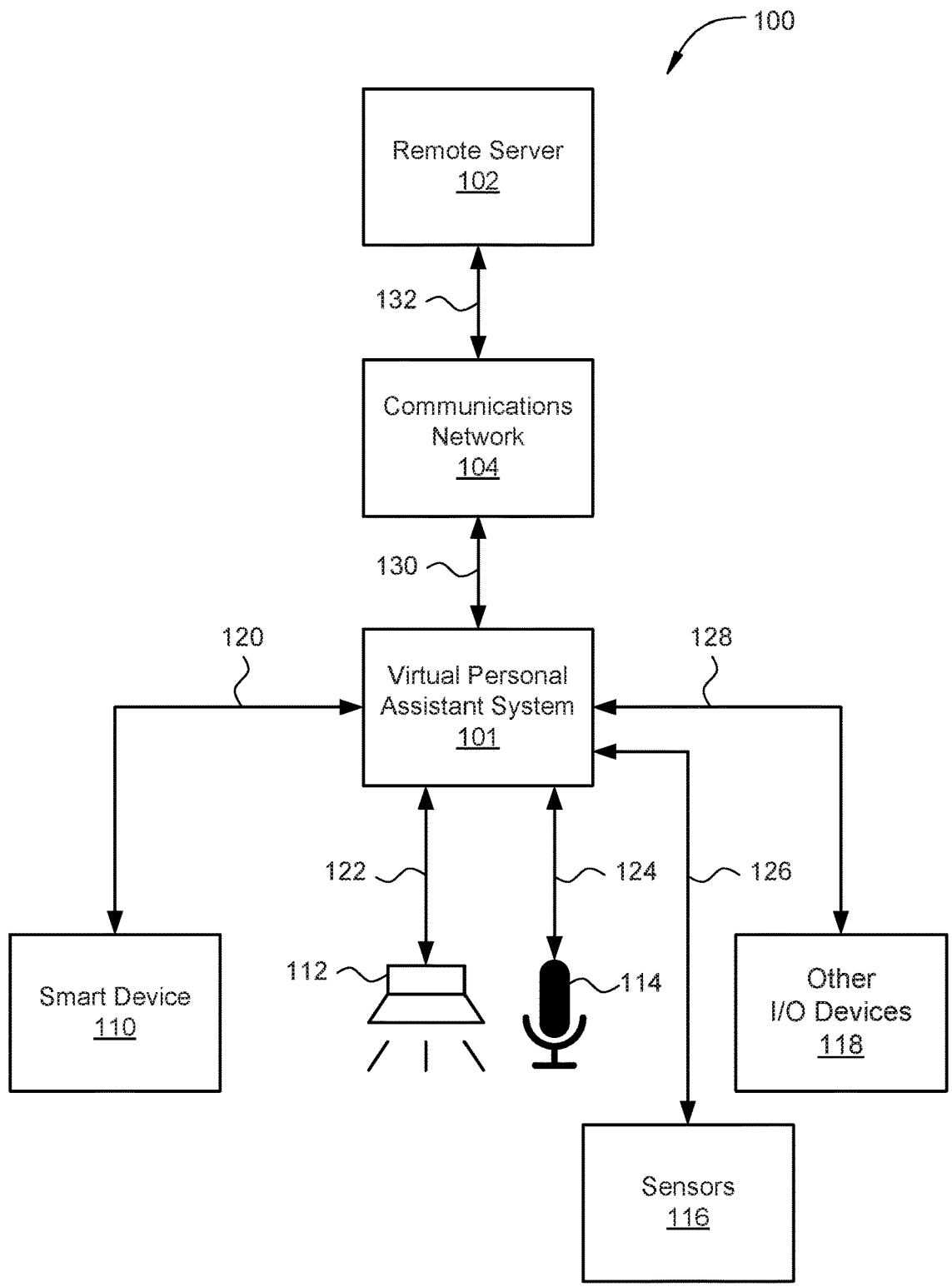
FIG. 1 illustrates a virtual personal assistant environment configured to implement one or more embodiments.

FIG. 1 illustrates a virtual personal assistant environment 100 configured to implement one or more embodiments. As shown, virtual personal assistant environment 100 includes, without limitation, a virtual personal assistant system 101 and a remote server 102 in communication with each other via a communications network 104. Virtual personal assistant system 101 and remote server 102 attach to communications network 104 via communications links 130 and 132, respectively. Communications network 104 may be any suitable environment to enable communications among remote or local computer systems and computing devices, including, without limitation, Bluetooth communications channels, wireless and wired LANs (Local Area Networks), Internet-based WANs (Wide Area Networks), cellular networks, and/or the like.

In addition, virtual personal assistant environment 100 includes a smart device 110, an audio output device (e.g., a speaker) 112, an audio input device (e.g., a microphone) 114, sensors 116 and other input/output (I/O) devices 118. Virtual personal assistant system 101 establishes communications and communicates with smart device 110, audio output device 112, audio input device 114, sensors 116, and other I/O devices 118 via communications links 120, 122, 124, 126, and 128, respectively. Communications links 120, 122, 124, 126, and 128 may be any technically feasible combination of wireless or wired point-to-point or networked communications links. Networked communications links include any suitable communications links to enable communications among remote or local computer systems and computing devices, including, without limitation, Bluetooth communications channels, wireless and wired LANs (Local Area Networks), Internet-based WANs (Wide Area Networks), cellular networks, and/or the like. Additionally or alternatively, communications links 120, 122, 124, 126, and 128 may provide communications via communications network 104.

Virtual personal assistant system 101 includes, without limitation, a computing device that may be a standalone server, a cluster or "farm" of servers, one or more network appliances, or any other device suitable for implementing one or more aspects of the present disclosure. Illustratively, virtual personal assistant system 101 communicates over communications network 104 via communications link 130.

In operation, virtual personal assistant system 101 engages with one or more users (e.g., the driver and passengers of a vehicle) via two-way natural language dialog. This two-way natural language dialog includes user(s)-to-vehicle and vehicle-to-user(s) communications. Virtual personal assistant system 101 combines data from internal sensors and data from external sensors to generate inferences about situations occurring within the vehicle and about situations occurring external to the vehicle. Further, virtual personal assistant system 101 combines data from internal sensors and data from external sensors to generate predictions or other results regarding the users(s), vehicle, and/or environment. Internal sensors include, without limitation, event data recorders (EDRs), on-board diagnostic information, sensors associated with the vehicle head unit, sensors associated with the vehicle information/entertainment (infotainment) system, data from the vehicle controller area network (CAN) bus, and data from the vehicle engine control unit (ECU). Images and other data from external cameras, radar units, and LIDAR units.

Generally, virtual personal assistant system 101 coordinates the overall operation of the virtual personal assistant environment 100. In that regard, in some embodiments, virtual personal assistant system 101 may be coupled to, but separate from other components of the virtual personal assistant system 101. In such embodiments, virtual personal assistant environment 100 may include one or more separate processors that receive data acquired from the surrounding environment and transmit the data to virtual personal assistant system 101. These separate processors may be included in a separate device, such as a vehicle head unit, personal computer, an audio-video receiver, a smartphone, a portable media player, a wearable device, etc. However, the embodiments disclosed herein contemplate any technically feasible system configured to implement the functionality of virtual personal assistant environment 100.

During vehicle-to-user(s) communications, virtual personal assistant system 101 monitors the internal and external vehicle environment by utilizing multiple sensors and notifying the users when a significant deviation from the current condition is detected. Virtual personal assistant system 101 generates audio speech output that describes the event, generates one or more alerts, and/or provides possible suggestions or solutions. During user(s)-to-vehicle communications, virtual personal assistant system 101 invokes external services according to the requests and needs of the users. In general, virtual personal assistant system 101 integrates sensor fusion data, computer vision, natural language processing, speech recognition, and driver-assistance techniques to deliver a safe, intelligent and personalized experience to the user(s) in a vehicle.

Remote server 102 includes, without limitation, a computing device that may be a standalone server, a cluster or "farm" of servers, one or more network appliances, or any other device suitable for implementing one or more aspects of the present disclosure. Illustratively, remote server 102 communicates over communications network 104 via communications link 132.

In operation, remote server 102 performs one or more of the techniques described herein in conjunction with virtual personal assistant system 101. In this regard, the disclosed techniques may be implemented by a cloud computing system that includes remote server 102 in conjunction with virtual personal assistant system 101 communicating via communications network 104. For example, virtual personal assistant system 101 may transmit speech data to remote server 102. Remote server 102 may process the speech data in any technically feasible manner to determine a request included in the speech data. Further, virtual personal assistant system 101 may transmit sensor data to the remote server 102. Remote server 102 may process the sensor data in any technically feasible manner to determine the state of the user(s), the vehicle, and/or the environment. Remote server 102 may generate a notice, alert, and/or response based on the determined state.

Smart device 110 includes, without limitation, a computing device that may be a personal computer, personal digital assistant, tablet computer, mobile phone, mobile device, or any other device suitable for implementing one or more aspects of the present invention. Illustratively, smart device 110 communicates with virtual personal assistant system 101 via communications link 120.

In operation, smart device 110 augments the functionality of virtual personal assistant system 101 by providing various services, including, without limitation, telephone services, navigation services, and infotainment services. Further, smart device 110 includes various sensors that are separate from the sensors 116 coupled to virtual personal assistant system 101. In this regard, smart device 110 acquires data from such sensors and transmits the data to virtual personal assistant system 101. Smart device 110 may include a speaker and a microphone that are separate from the audio output device 112 and audio input device 114 coupled to virtual personal assistant system 101. Smart device 110 acquires sound data via audio input device 114 and transmits the sound data to virtual personal assistant system 101 for processing. Likewise, smart device 110 receives sound data from virtual personal assistant system 101 and transmits the sound data via the loudspeaker so that the user(s) are able to hear audio originating from virtual personal assistant system 101 via the loudspeaker located on smart device 110.

Audio output device 112 generates sound based on one or more audio signals received from virtual personal assistant system 101 and/or an alternative audio device, such as a power amplifier associated with virtual personal assistant system 101. More specifically, audio output device 112 converts one or more electrical signals into sound waves and directs the sound waves into the physical environment. Illustratively, audio output device 112 communicates with virtual personal assistant system 101 via communications link 122.

Audio input device 114 acquires acoustic data, such as the voice of a user, from the surrounding environment and transmits signals associated with the acoustic data to virtual personal assistant system 101. Illustratively, audio input device 114 communicates with virtual personal assistant system 101 via communications link 124.

In operation, sensors 116 acquire sensor data corresponding to one or more objects included in an area being monitored by the sensors 140 and transmit such sensor data to virtual personal assistant system 101. Illustratively, sensors 116 communicate with virtual personal assistant system 101 via communications link 126.

Other I/O devices 118 include, without limitation, input devices, output devices, and devices capable of both receiving input data and generating output data. Illustratively, other I/O devices 118 communicate with virtual personal assistant system 101 via communications link 128.

It will be appreciated that the system shown herein is illustrative and that variations and modifications are possible. For example, the virtual personal assistant environment 100 may include any technically feasible number of smart devices 110, audio output devices 112, audio input devices 114, sensors 116, and other I/O devices 118. The various functions and features of virtual personal assistant system 101 are now described.

Operations of the Virtual Personal Assistant System

Figure 2:
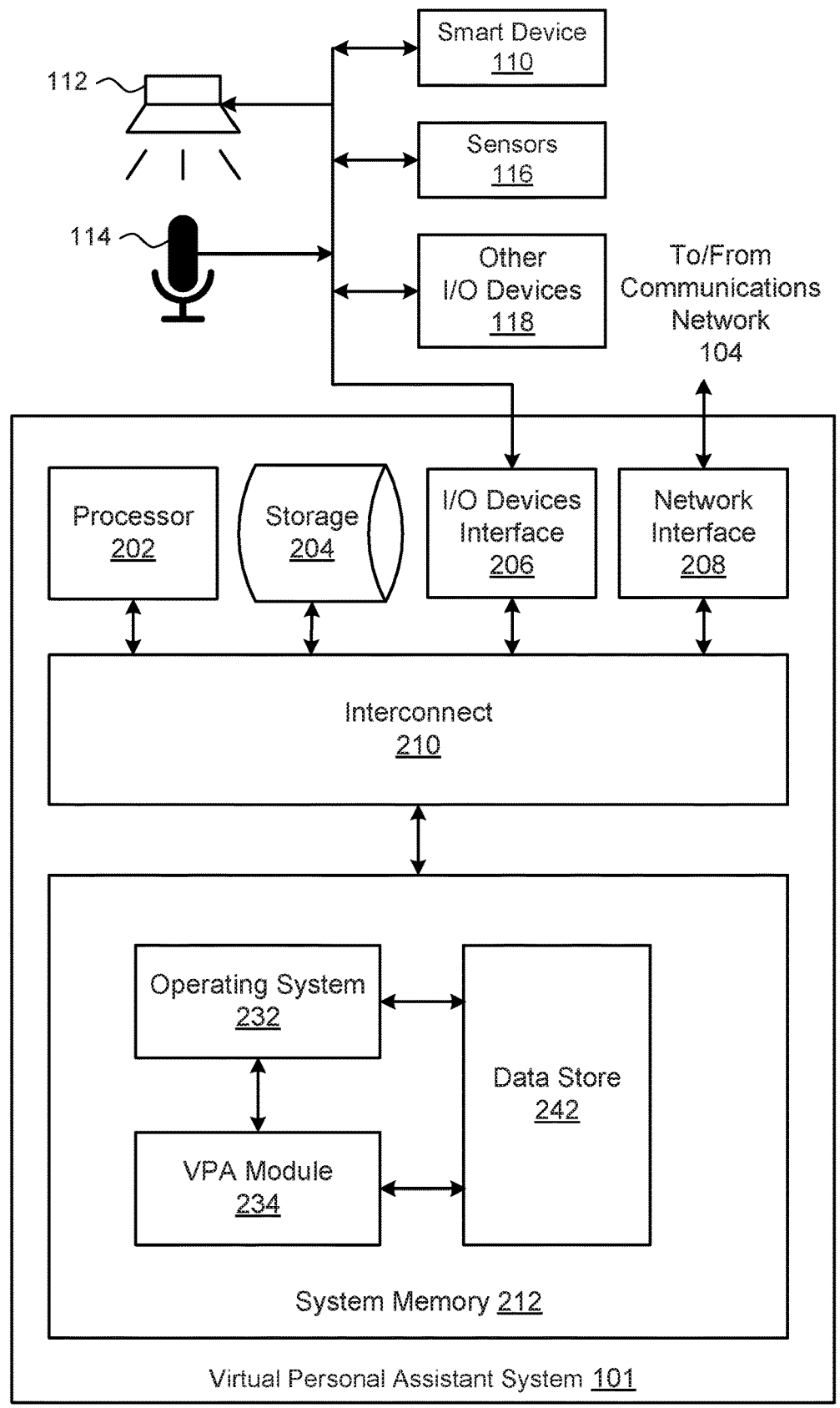
FIG. 2 is a more detailed illustration of the virtual personal assistant system of FIG. 1, according to various embodiments.

FIG. 2 is a more detailed illustration of the virtual personal assistant system 101 of FIG. 1, according to various embodiments. As shown, virtual personal assistant system 101 includes, without limitation, a processor 202, storage 204, an I/O devices interface 206, a network interface 208, an interconnect 210, and a system memory 212.

Processor 202 retrieves and executes programming instructions stored in system memory 212. Similarly, processor 202 stores and retrieves application data residing in system memory 212. Interconnect 210 facilitates transmission, such as of programming instructions and application data, between processor 202, I/O devices interface 206, storage 204, network interface 208, and system memory 212. I/O devices interface 206 is configured to receive input data from and transit data to smart device 110, audio output device 112, audio input device 114, sensors 116, and other I/O devices 118.

I/O devices interface 206 includes an audio output unit configured to generate an electrical audio output signal and, in response, audio output device 112 generates an acoustic output in response to the electrical audio output signal. Audio output device 112 generates sound based on one or more audio signals received from virtual personal assistant system 101 and/or an audio device (e.g., a power amplifier) associated with virtual personal assistant system 101.

I/O devices interface 206 includes an audio input unit configured to receive an acoustic input via audio input device 114 and generate an electrical audio input signal in response to the acoustic input. Audio input device 114 acquires acoustic data from the surrounding environment (e.g., a voice of a user) and transmits signals associated with the acoustic data to virtual personal assistant system 101. Virtual personal assistant system 101 may then process the acoustic data acquired by audio input device 114 to determine and/or filter the audio signals being reproduced by audio output device 112. In various embodiments, audio input device 114 may include any type of transducer capable of acquiring acoustic data including, for example and without limitation, a differential microphone, a piezoelectric microphone, an optical microphone, etc.

Sensors 116 generate sensor data corresponding to one or more objects included in an area being monitored. For example, and without limitation, sensors 116 may include visual sensors (e.g., RGB cameras, infrared cameras, etc.), distance measurement sensors (e.g., LIDAR, radar), biological sensors (e.g., electroencephalography sensors, etc.), auditory sensors (e.g., microphones), behavior sensors (e.g., mobile usage sensors, etc.), vehicle or telematics sensors (e.g., speedometers, etc.), and/or environment sensors (e.g., thermometers, etc.). Data from these sensors may be "fused" (e.g., aggregated and analyzed together) to generate meaningful information, warnings, recommendations, etc.

Other I/O devices 118 include, without limitation, input devices, output devices, and devices capable of both receiving input data and generating output data. For example, and without limitation, I/O devices 104 may include wired and/or wireless communication devices that send data to and/or receive data from audio output device 112, audio input device 114, sensors 116, remote databases, audio devices, display devices, other computing devices, etc.

Additionally, in some embodiments, I/O devices 104 may include a push-to-talk (PTT) button, such as a PTT button included in a vehicle, on a mobile device, on a smart speaker, etc. Examples of other I/O devices 118 may include one or more buttons, a keyboard, and a mouse or other pointing device. Examples of other I/O devices 118 may further include a display device that generally represents any technically feasible means for generating an image for display. For example, the display device may be a liquid crystal display (LCD) display, organic light-emitting diode (OLED) display, or digital light processing (DLP) display. The display device may be a TV that includes a broadcast or cable tuner for receiving digital or analog television signals. The display device may be included in a VR/AR headset. Further, the display device may project an image onto one or more surfaces, such as walls or projection screens, or may project an image directly onto the eyes of a user. The display device may include a touchscreen for receiving touch-based input.

Processor 202 is included to be representative of a single central processing unit (CPU), multiple CPUs, a single CPU having multiple processing cores, and the like. And system memory 212 is generally included to be representative of a random access memory. Storage 204 may be a disk drive storage device. Although shown as a single unit, storage 204 may be a combination of fixed and/or removable storage devices, such as fixed disc drives, floppy disc drives, tape drives, removable memory cards, or optical storage, network attached storage (NAS), or a storage area-network (SAN). Processor 202 communicates to other computing devices and systems via network interface 208, where network interface 208 is configured to transmit and receive data via a communications network.

System memory 212 includes, without limitation, an operating system 232, a virtual personal assistant (VPA) module 234, and a data store 242. Operating system 232 and virtual personal assistant module 234, when executed by processor 202, perform one or more operations associated with the virtual personal assistant system 101 of FIG. 1, as further described herein. When performing the operations associated with virtual personal assistant system 101, operating system 232 and virtual personal assistant module 234 may store data in and retrieve data from data store 242.

In operation, operating system 232 provides various support functions for virtual personal assistant system 101. Processor 202 is generally under the control of operating system 232. Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used.

In operation, virtual personal assistant module 234 engages with the user(s) of a vehicle via two-way natural language dialog. This two-way natural language dialog includes user(s)-to-vehicle and vehicle-to-user(s) communications. Virtual personal assistant module 234 combines data from internal sensors and data from external sensors to generate inferences about situations occurring within the vehicle and about situations occurring external to the vehicle. Further, virtual personal assistant module 234 combines data from internal sensors and data from external sensors to generate predictions or other results regarding the user(s), vehicle, and/or environment. Internal sensors include, without limitation, event data recorders (EDRs), on-board diagnostic information, sensors associated with the vehicle head unit, sensors associated with the vehicle information/entertainment (infotainment) system, data from the vehicle controller area network (CAN) bus, and data from the vehicle engine control unit (ECU). Images and other data from external cameras, radar units, and LIDAR units.

In some embodiments, virtual personal assistant module 234 may include the text-to-speech functionality, speech-to-text functionality, natural language processing functionality, sensor fusion system, and deep learning models and logic, as further described herein. For example, and without limitation, virtual personal assistant module 234 may process speech data acquired via one or more audio input devices 114 to determine a request (e.g., a question) and/or a concept (e.g., meaning, intent) of the request. Virtual personal assistant module 234 may then determine a response to the request based on sensor data from one or more sensors 116, generate an output (e.g., a speech output) based on the response, and cause the output to be output to a user (e.g., via an audio output device). In various embodiments, one or more deep learning, machine learning models, and/or training datasets may be stored in the memory 110 (e.g., in data store 242). In some embodiments, data store 242 may be located within virtual personal assistant system 101 (e.g., in system memory 212) and/or in a remote server such as remote server 102 (e.g., in a cloud computing system).

As a further example, virtual personal assistant module 234 may process sensor data from one or more sensors 116 to detect a state of the user(s), the vehicle, and/or the environment. In some embodiments, virtual personal assistant module 234 may determine whether the state exceeds a threshold. In response to detecting the state (and, in some embodiments, in response to determining that the state exceeds the threshold), virtual personal assistant module 234 generates an output (e.g., a natural language speech output) and causes the output to be output to a user (e.g., via an audio output device).

In various embodiments, virtual personal assistant module 234 provides information to users according to a user-to-assistant approach. In the user-to-assistant approach, a user makes a speech utterance directed to virtual personal assistant module 234. In some embodiments, the speech includes a wakeword or hotword associated with virtual personal assistant module 234. In some embodiments, the user may activate an input device associated with virtual personal assistant module 234 (e.g., a physical or virtual button configured to signal virtual personal assistant module 234 that an utterance from the user is forthcoming, such as a push-to-talk button) prior to making the utterance. Virtual personal assistant module 234 acquires speech data, corresponding to the speech utterance, via the one or more audio input devices 114. Virtual personal assistant module 234 processes the speech data to determine a request in the speech in any technically feasible manner. For example, virtual personal assistant module 234 may perform speech recognition to convert the speech data into a text of a request embodied in the speech data (e.g., a question corresponding to the request). Virtual personal assistant module 234 may then perform natural language processing on the text (e.g., using a natural language model) in order to determine a concept (e.g., a meaning, an intent) of the request.

Virtual personal assistant module 234 may then, based on the request and the concept of the request, acquire and process sensor data from sensors 116 to determine a response to the request. For example, if the request is "what is the speed of the blue sedan on my right lane?", then virtual personal assistant module 234 may determine that sensor data from one or more cameras (e.g., RGB cameras, infrared cameras), radar, and thermal sensors are the sensors most relevant to the request. Virtual personal assistant module 234 obtains sensor data from these sensors to identify the blue sedan in the request and to determine the speed of that blue sedan. That is, virtual personal assistant module 234 "fuses" data from these sensors in order to determine a response to the request.

In various embodiments, the processing or "fusing" of the sensor data may include applying one or more models to the sensor data to predict one or more states based on the sensor data. For example, to process the request "what is the speed of the blue sedan in the right lane?" discussed above, virtual personal assistant module 234 may apply a computer vision model on the data from the cameras and a signal processing model on the radar and thermal sensors to predict the target object of the request ("the blue sedan in the right lane"). Virtual personal assistant module 234 aggregates the predictions and/or other results from the multiple models to determine the proper response to the request. As another example, if the request is "what is my baby doing?", then virtual personal assistant module 234 may apply a computer vision model (e.g., a person recognition model, a face recognition model) to predict the target baby in the area and apply an activity recognition model to predict the activity status of the baby. Virtual personal assistant module 234 then aggregates the predictions and/or other results in order to determine the proper response to the request. More generally, virtual personal assistant module 234 aggregates determinations, predictions, and/or results based on sensor data from one or more sensors to determine the proper response to a request. In various embodiments, virtual personal assistant module 234 may use any number of deep learning techniques and models (e.g., machine learning techniques) to determine the proper response.

Virtual personal assistant module 234 may then generate an output (e.g., a speech output) based on the response to the request in any technically feasible manner. For example, virtual personal assistant module 234 may apply a natural language model to the response to obtain a natural language textual representation of the response, and then convert the textual representation to speech that may be output via audio output device 112. Virtual personal assistant module 234 then causes the output to be output to a user (e.g., output speech corresponding to the response via audio output device 112). The response and corresponding output may include an answer to the request. For example, for the request "what is the speed of the blue sedan in the right lane?", the output may report the speed of the blue sedan in the right lane. The response and corresponding output may optionally include a suggested course of action. In various embodiments, virtual personal assistant module 234 may use any number of machine learning and deep learning techniques and models to determine the suggested course of action.

In various embodiments, virtual personal assistant module 234 also provides information to users according to an assistant-to-user approach. In the assistant-to-user approach, virtual personal assistant module 234 monitors sensor data from sensors 116 (e.g., continuously monitor the sensor data) and determines one or more states based on the sensor data in any technically feasible manner. For example, virtual personal assistant module 234 may process or "fuse" the data from sensors 116, including applying similar machine learning and deep learning models as described above to the sensor data, to detect one or more states in the area (e.g., the speeds of the surrounding vehicles, the activity status of vehicle occupants).

In some embodiments, in response to the detected states, virtual personal assistant module 234 may first compare a detected state to an associated threshold. The threshold may be predefined and/or user-configurable. If the state does not exceed the threshold, then virtual personal assistant module 234 takes no action with respect to the state. If the state exceeds the threshold, then virtual personal assistant module 234 may generate a notice or alert output associated with the state. In some embodiments, virtual personal assistant module 234 may generate a notice or alert output for at least one or more states without regard for whether the state exceeded the threshold. For example, virtual personal assistant module 234 may be configured by a user to report on the activity status of all occupants in the rear seating of a vehicle every 5 minutes regardless of what the occupants are doing.

Virtual personal assistant module 234 may determine a notice or alert, and generate a corresponding output for the notice or alert, based on a detected state (e.g., if the detected state exceeds an associated threshold). The notice or alert, and the corresponding output, may include information on the detected state, and optionally include a suggested course of action in response to the detected state. In various embodiments, virtual personal assistant module 234 may use any number of machine learning and deep learning techniques and models to determine the suggested course of action. For example, if the detected state includes erratic driving by a vehicle on the lane to the right of the user's vehicle, the notice or alert may inform the user of the erratically driven vehicle and suggest that the user change lanes in a direction away from the erratically driven vehicle and/or slow down to obtain greater distance from the erratically driven vehicle.

In some embodiments, virtual personal assistant module 234 may perform other operations in addition to or in alternative to generating audio speech output messages. In one example, virtual personal assistant module 234 may assume or exercise autonomous control of the vehicle at various control levels depending on certain conditions. If virtual personal assistant module 234 determines, via one or more sensors, that the user is driving the vehicle on city streets, then virtual personal assistant module 234 may allow the user to have full control of the vehicle. In some embodiments, if virtual personal assistant module 234 detects certain conditions, then virtual personal assistant module 234 may temporarily assume or exercise autonomous control or further autonomous control of the vehicle. For example, if virtual personal assistant module 234 predicts that the user is likely to run a red light or stop sign, then virtual personal assistant module 234 may apply a braking function to slow down and/or stop the vehicle. If virtual personal assistant module 234 subsequently determines, via one or more sensors, that the user is now driving the vehicle on the highway, then virtual personal assistant module 234 may exert partial autonomous control and follow certain patterns, such as following another vehicle in a particular traffic lane at a safe distance. If virtual personal assistant module 234 then determines, via one or more sensors, that the user is exiting the highway, then virtual personal assistant module 234 may return full control of the vehicle to the user.

In some embodiments, virtual personal assistant module 234 may disguise certain personally identifiable information when transmitting visual input and sensor data to a remote server, such as remote server 102, in a cloud environment.

In such embodiments, virtual personal assistant module 234 may obscure personally identifying information, such as by blurring faces in an image and hiding personal identity information in sensor data, so that individuals are not identifiable. This technique may be preferable when sensor data from one user is combined with sensor data from multiple users to generate a multiuser machine learning model that all users may access. Visual input and sensor data may then be employed to train a multiuser machine learning model without compromising the privacy of individual users.

In some embodiments, virtual personal assistant module 234 may allow remote access to visual input and sensor data. In one example, a vehicle may be part of a managed fleet of vehicles belonging to a delivery company or a taxi service. A supervisor or other employee may remotely monitor visual input and sensor data from various vehicles in the fleet to determine that each vehicle is being used in a proper and safe manner. In another example, emergency services or police may remotely monitor visual input and sensor data from a particular vehicle to detect dangerous, life-threatening, or illegal activity occurring within the vehicle.

Figure 3:
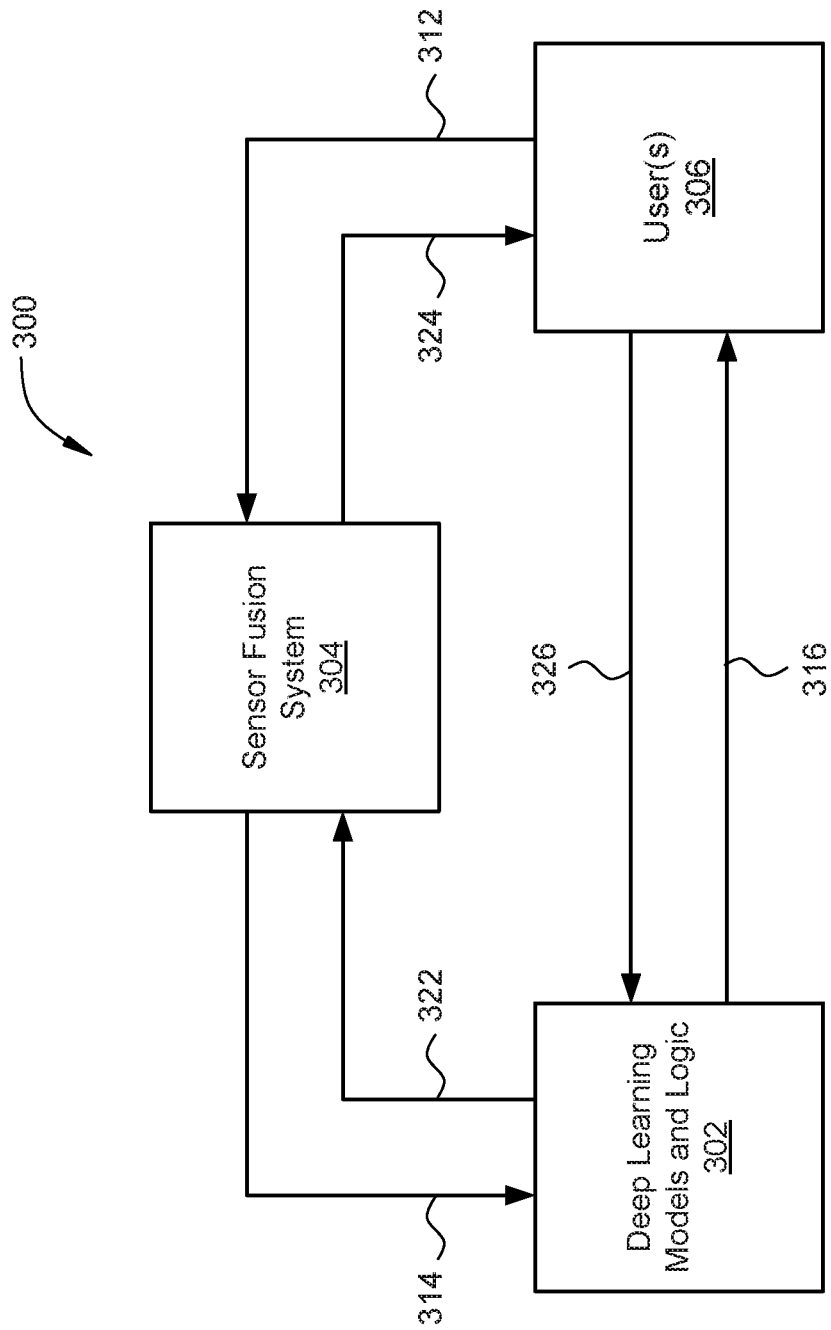
FIG. 3 illustrates a data model associated with a virtual personal assistant system, according to various embodiments.

FIG. 3 illustrates a data model 300 associated with a virtual personal assistant system, such as the virtual personal assistant system 101, according to various embodiments. The data model 300 may be implemented by the virtual personal assistant module 234 executing on the virtual personal assistant system 101 of FIG. 2. The data model 300 includes, without limitation, deep learning models and logic 302, a sensor fusion system 304, and user(s) 306. The data model 300 further includes a user-to-vehicle interaction path that includes paths 312, 314, and 316, as well as a vehicle-to-user interaction path that includes paths 322, 324, and 326, During the user-to-vehicle interaction path, a user 306 asks a question or makes a request. Sensor fusion system 304 receives the question or request via path 312. Sensor fusion system 304 preprocesses sensor data and transmits preprocessed sensor data to deep learning models and logic 302 via path 314. Responses in the form of audio speech output are generated by applying deep learning models and logic 302 to the preprocessed sensor data. The responses in the form of audio speech output are transmitted to the user(s) 306 via path 316.

During the vehicle-to-user interaction path, deep learning models and logic 302 are applied to sensor data. For example, a computer vision model may be applied to visual data, including, without limitation, camera inputs and infrared inputs. A signal processing model may be applied to other sensor data, including, without limitation, radar inputs and thermal sensor inputs. Deep learning models and logic 302 continually monitor the sensor data to generate one or more predictions. Deep learning models and logic 302 transmits the predictions along path 322 to sensor fusion system 304. Sensor fusion system 304 merges predictions received from various deep learning models and logic 302 to generate an aggregate prediction value. The aggregate prediction value is then compared to a threshold level. If the prediction value exceeds then threshold level, then an audio speech message, such as a notice or alert, is generated. The audio speech message is transmitted to the user(s) 306 along path 324. The user(s) 306 may perform one or more actions in response to the audio speech message. Various sensors monitor the actions of the user(s) 306 and transmit corresponding sensor data, in the form of user feedback data, to deep learning models and logic 302. Deep learning models and logic 302 are modified in response to the user feedback data, in order continually train and improve the models and logic therein. In this manner, deep learning models and logic 302 continually self-learns and matures over time.

Figure 4:
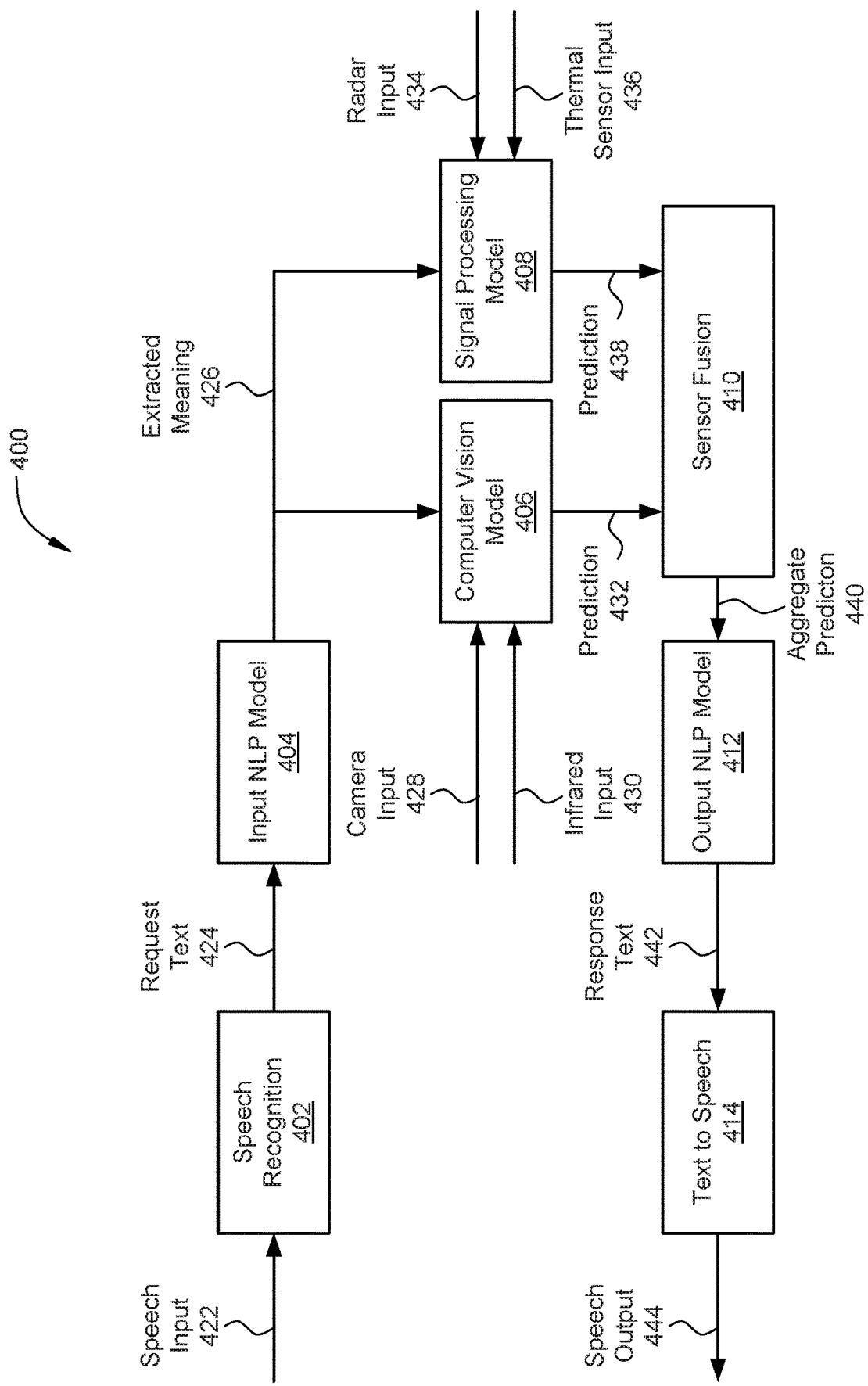
FIG. 4 illustrates a data flow pipeline for an interaction initiated by a user of a virtual personal assistant system, according to various embodiments.
Figure 5:
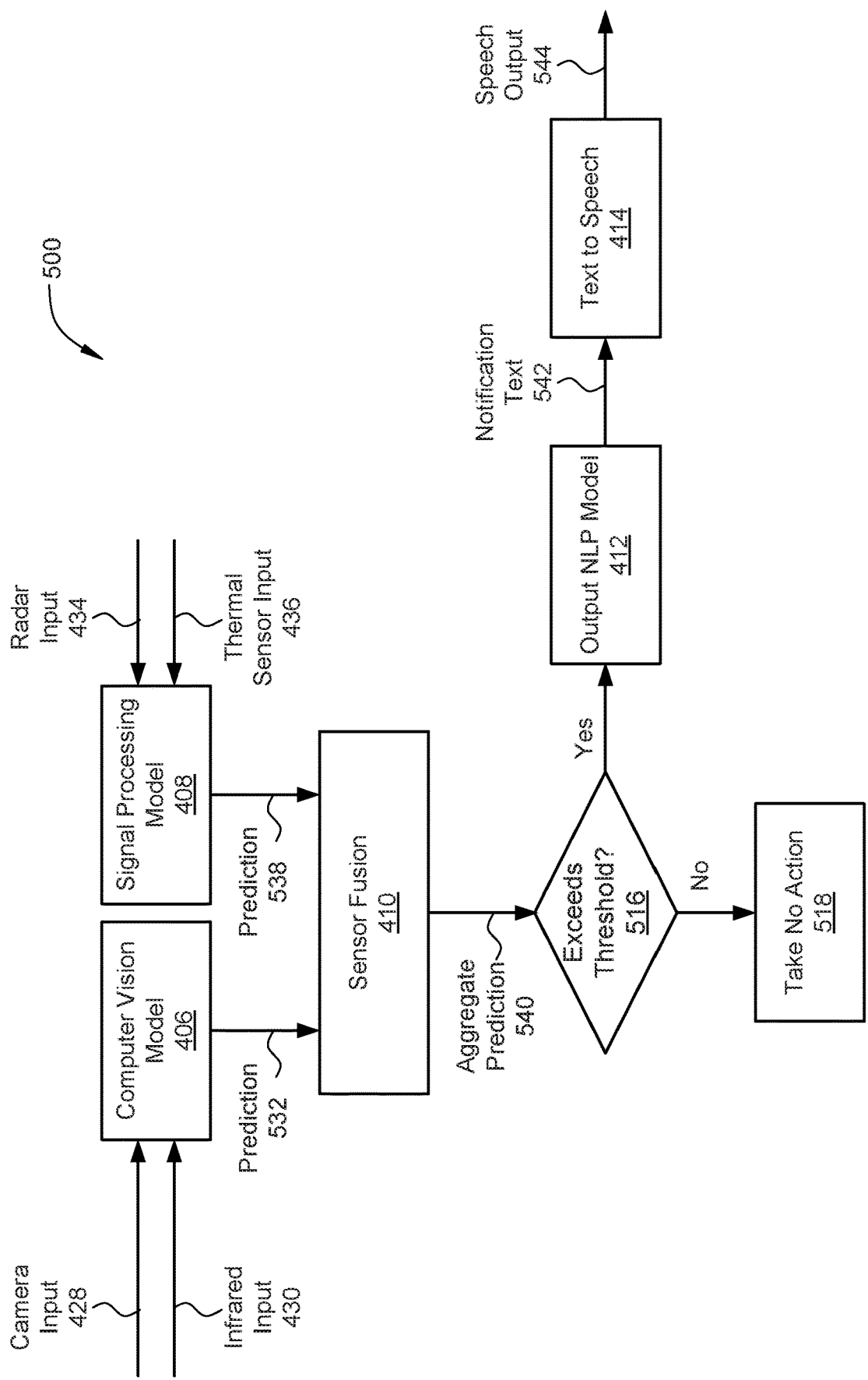
FIG. 5 illustrates a data flow pipeline for an interaction initiated by a virtual personal assistant system, according to various embodiments.

The user-to-vehicle interaction path and vehicle-to-user interaction path are now described in conjunction with FIGS. 4 and 5, respectively.

FIG. 4 illustrates a data flow pipeline 400 for an interaction initiated by a user of a virtual personal assistant system, such as the virtual personal assistant system 101, according to various embodiments. Data flow pipeline 400 corresponds to the user-to-vehicle interaction path of FIG. 3. As shown, the data flow pipeline 400 includes, without limitation, speech recognition 402, an input natural language processing (NLP) model 404, a computer vision model 406, a signal processing model 408, sensor fusion 410, an output NLP model 412, and text to speech 414.

A user initiates a conversation with virtual personal assistant system 101 by making a request within the scope of virtual personal assistant system 101. Speech recognition 402 receives speech input 422 in the form of sound waves received via audio input device 114. Speech recognition 402 decoded the speech input 422 into request text 424 and transmits the request text 424 to input NLP model 404.

Input NLP model 404 analyzes the request text 424 to generate an extracted meaning 426 that represents a meaning or intent of the user who uttered the words represented by the request text 424. The extracted meaning 426 generated by input NLP model 404 determines the predictions needed to respond to the user. Input NLP model 404 transmits the extracted meaning 426 to computer vision model 406 and signal processing model 408.

Computer vision model 406 analyzes visual inputs, including, without limitation, camera input 428 and infrared input 430, in view of the extracted meaning 426. Computer vision model 406 generates a prediction 432 based on the visual inputs and the extracted meaning 426. Similarly, signal processing model 408 analyzes sensor data, including, without limitation, radar input 434 and thermal sensor input 436, in view of the extracted meaning 426. Signal processing model 408 generates a prediction 438 based on the sensor data and the extracted meaning 426. Sensor fusion 410 combines predictions received from various models, including, without limitation, prediction 432 received from computer vision model 406 and prediction 438 received from signal processing model 408. Sensor fusion 410 combines these predictions to generate an aggregate prediction 440 based on the individual predictions. Sensor fusion 410 transmits the aggregate prediction 440 to output NLP model 412. Output NLP model 412 generates a natural language response text 442 based on the aggregate prediction 440. Text to speech 414 converts the response text 442 to speech output 444 and transmits the speech output 444 to the user.

FIG. 5 illustrates a data flow pipeline 500 for an interaction initiated by a virtual personal assistant system, such as the virtual personal assistant system 101, according to various embodiments. Data flow pipeline 500 corresponds to the vehicle-to-user interaction path of FIG. 3. As shown, the data flow pipeline 500 includes, without limitation, a computer vision model 406, a signal processing model 408, sensor fusion 410, an "exceeds threshold" decision block 516, a "take no action" block 518, an output NLP model 412, and text to speech 414.

With this data flow pipeline 500, virtual personal assistant system 101 initiates a conversation to notify or alert the user with information about the vehicle, the environment external to the vehicle, and/or the environment inside the vehicle cabin. Various models monitor visual data and other sensor data on a continuing basis to detect anomalies. In that regard, computer vision model 406 analyzes visual inputs, including, without limitation, camera input 428 and infrared input 430. Computer vision model 406 generates a prediction 532 based on the visual inputs. Similarly, signal processing model 408 analyzes sensor data, including, without limitation, radar input 434 and thermal sensor input 436. Signal processing model 408 generates a prediction 538 based on the sensor data. Sensor fusion 410 combines predictions received from various models, including, without limitation, prediction 532 received from computer vision model 406 and prediction 538 received from signal processing model 408. Sensor fusion 410 combines these predictions to generate an aggregate prediction 540 based on the individual predictions.

The "exceeds threshold" decision block 516 compares the aggregate prediction 540 to a predetermined threshold level. If the aggregate prediction 540 does not exceed the predetermined threshold level, then no action is taken at "take no action" block 18." If, on the other hand, the aggregate prediction 540 exceeds the predetermined threshold level then output NLP model 412 generates a natural language notification text 542 based on the aggregate prediction 540. Text to speech 414 converts the notification text 542 to speech output 544 and transmits the speech output 544 to the user. In some embodiments, virtual personal assistant system 101 may assume or exercise autonomous control of the vehicle at various control levels depending on certain conditions. In cases where the user is drunk, inattentive, or drowsy, or where a life threatening condition is present, virtual personal assistant system 101 may increase the level of autonomy to take control of driving away from the user. If virtual personal assistant system 101 subsequently determines that the driver is sober, attentive, and awake, virtual personal assistant system 101 may decrease the level of autonomy to transfer control of driving back to the user.

Figure 6:
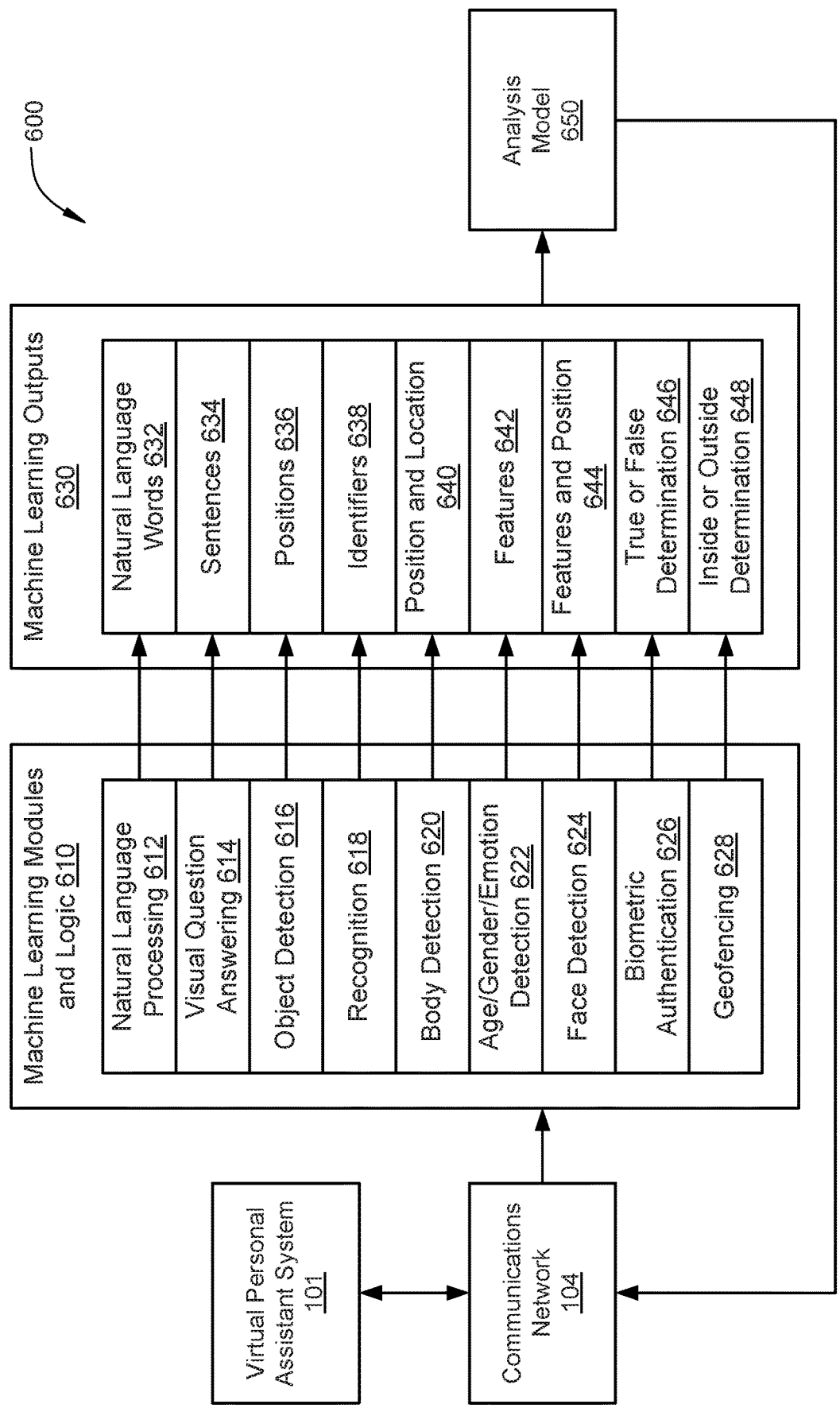
FIG. 6 illustrates a deep learning process flow associated with a virtual personal assistant system, according to various embodiments.

FIG. 6 illustrates a deep learning process flow 600 associated with a virtual personal assistant system, such as the virtual personal assistant system 101, according to various embodiments. As shown, virtual personal assistant system 101 communicates with machine learning modules and logic 610 via communications network 104. Machine learning modules and logic 610 execute on a remote server, such as remote server 102. In operation, virtual personal assistant system 100 acquires visual input and sensor data. Virtual personal assistant system 100 transmits the visual input and sensor data to machine learning modules and logic 610 via communications network 104. Each of the components of machine learning modules and logic 610 are pre-trained machine learning models that generate corresponding outputs included in the machine learning outputs 630, where the corresponding output is based on the received visual input and sensor data. The machine learning outputs 630 are generated on a remote server, such as remote server 102.

In that regard, natural language processing 612 generates natural language words 632 based on the visual input and sensor data. Visual questioning answering (VQA) 614 generates sentences 634 describing answers to questions that can be asked about an image or other visual data. Object detection 616 generates positions 636 of the detected objects. Recognition 618 generates identifiers 638 of people recognized within an image or other visual data. Body detection 620 generates position and location of bodies of people within an image or other visual data. Age/gender/emotion detection 622 generates features 642 indicative of the age, gender, and emotional state of people within an image or other visual data. Face detection 624 generates features and positions 644 related to faces of people within an image or other visual data. Biometric authentication 626 generates a true or false determination 646 based on whether biometric data within an image or other visual data matches stored biometric data. Geofencing 628 generates an inside or outside determination 648 based on whether a detected location of the vehicle is inside or outside a geofenced area of interest.

The machine learning outputs 630 generated by the various machine learning modules and logic 610 are transmitted to an analysis model 650. Analysis model 650 generates one or more predicted actions of the user(s) and transmits the predicted actions to visual personal assistance system 101 via communications network 104. Visual personal assistance system 101 then performs one or more responsive actions based on the predicted actions received from analysis model 650. For example, visual personal assistance system 101 may generate natural language responses based on the predicted actions thresholds and then output the natural language responses to the user(s).

As shown in FIG. 6, machine learning modules and logic 610 execute and machine learning outputs 630 are generated on a remote server, such as remote server 102. Additionally or alternatively, machine learning modules and logic 610 execute locally on virtual personal assistance system 101 and machine learning outputs 630 are generated locally on virtual personal assistance system 101.

Figure 7:
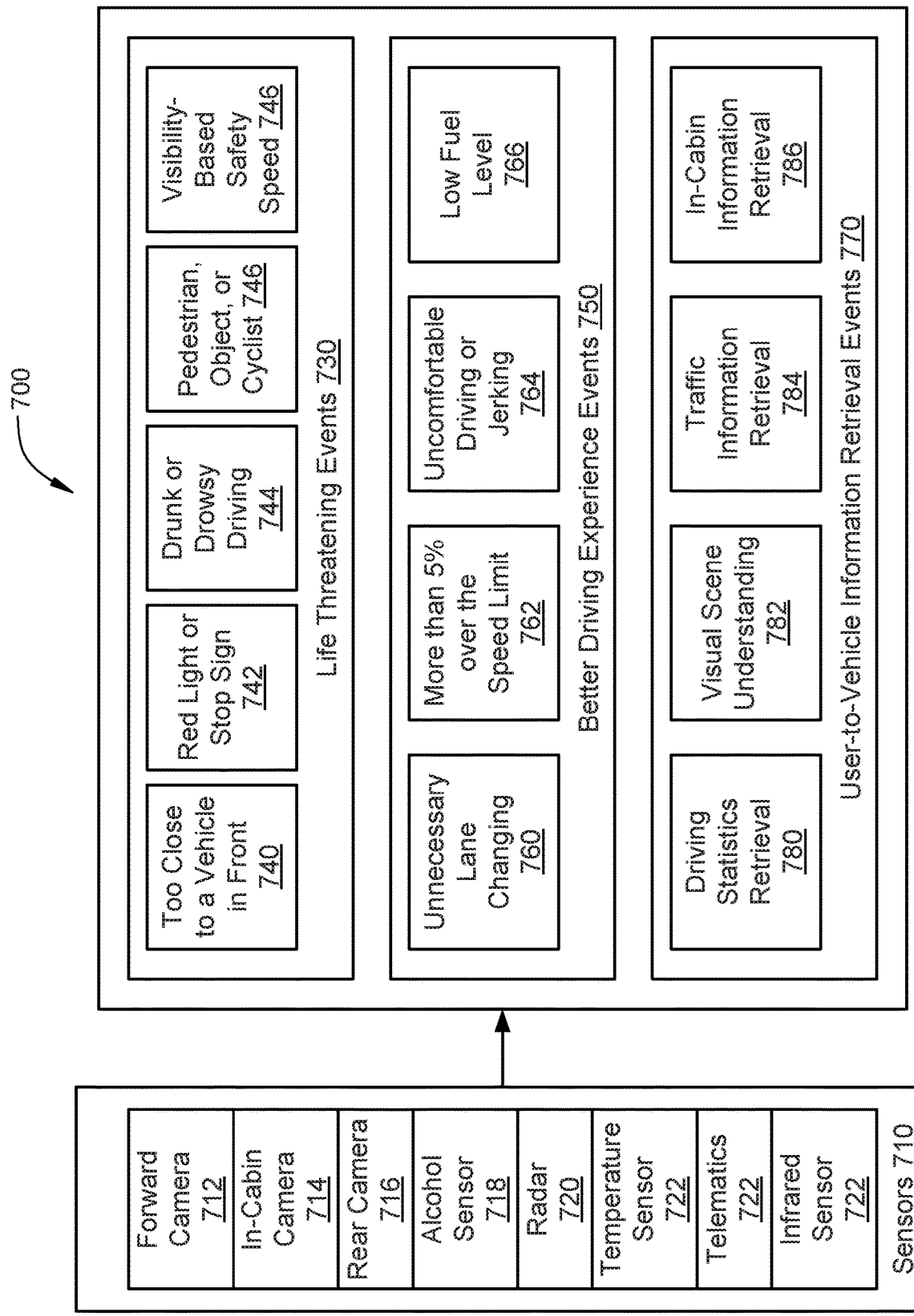
FIG. 7 illustrates various applications performed by a virtual personal assistant system, according to various embodiments.

FIG. 7 illustrates various modules 700 performed by a virtual personal assistant system, such as the virtual personal assistant system 101, according to various embodiments. As shown, the modules 700 receive visual input and sensor data from various sensors 710 and perform various functions categorized into three types of events, namely, life threatening events 730, better driving experience events 750, and user-to-vehicle information retrieval events 770. The user may enable or disable these three event types independently.

Life threatening events 730 include, without limitation, following too close to a vehicle in front 740, approaching a red light or stop sign 742, drunk, inattentive, or drowsy driving 744, approaching pedestrian, object, or cyclist 746, and exceeding a visibility-based safety speed 746. More generally, life threatening events include any condition where the user is driving in an impaired or inattentive condition or where the vehicle is in danger of colliding with an object. In one example, modules 700 related to life threatening events 730 may analyze visual input from forward camera 712 and in-cabin camera 714 with telematics 722 sensor data to determine that the user is approaching a red light or stop sign 742 and is unlikely to stop in time. In another example, modules 700 related to life threatening events 730 may analyze visual input from in-cabin camera 714 and alcohol sensor 718 data to determine if the user is engaging in drunk or drowsy driving 744. In yet another example, modules 700 related to life threatening events 730 may analyze visual input from rear camera 716 and radar 720 data to determine if a pedestrian or cyclist 746 is approaching from behind. In yet another example, modules 700 related to life threatening events 730 may analyze visual input from forward camera 712, in-cabin camera 714, and rear camera to determine if the user is exceeding a visibility-based safety speed 746 based on current weather or road conditions.

Better driving experience events 750 include, without limitation, unnecessary lane changing 760, more than 5% over the speed limit 702, uncomfortable driving or jerking 764, and low fuel level 766. In one example, modules 700 related to better driving experience events 750 may notify the user when the user is repeatedly changing lanes unnecessarily or when the user is exceeding the speed limit by more than a specified percentage. In another example, modules 700 related to better driving experience events 750 may notify the user when a vehicle to the rear is tailgating. In yet another example, modules 700 related to better driving experience events 750 may notify the user when an emergency vehicle is nearby and may identify the direction and distance of the emergency vehicle. In yet another example, modules 700 related to better driving experience events 750 may notify the user when the user appears to be uncomfortable or is jerking excessively. In yet another example, modules 700 related to better driving experience events 750 may notify the user when the fuel level is low and may identify the nearest gas station.

User-to-vehicle information retrieval events 770 include, without limitation, driving statistics retrieval 780, visual scene understanding 782, traffic information retrieval 784, and in-cabin information retrieval 786. The user may ask questions of the virtual personal assistant system 101 via user-to-vehicle information retrieval events 770. In one example, the user may direct questions to modules 700 related to better driving experience events 750 to ask the average or highest speed in the past hour, to identify a particular building within view, or to assess the current level of visibility. In another example, the user may direct questions to modules 700 related to better driving experience events 750 to ask the whether the right lane is clear for making a lane change or to ask the travel time to a particular location. In yet another example, the user may direct questions to modules 700 related to better driving experience events 750 to ask questions regarding one or more nearby persons, such as whether the person on the left rear seat sleeping.

Via these various modules 700, the user(s) interact with virtual personal assistant system 101 in a natural manner based on a wide array of sensor data from sensors 710. As a result, the user(s) receive relevant and timely information in an understandable manner regarding life threatening events 730, better driving experience events 750, and user-to-vehicle information retrieval events 770.

Figure 8:
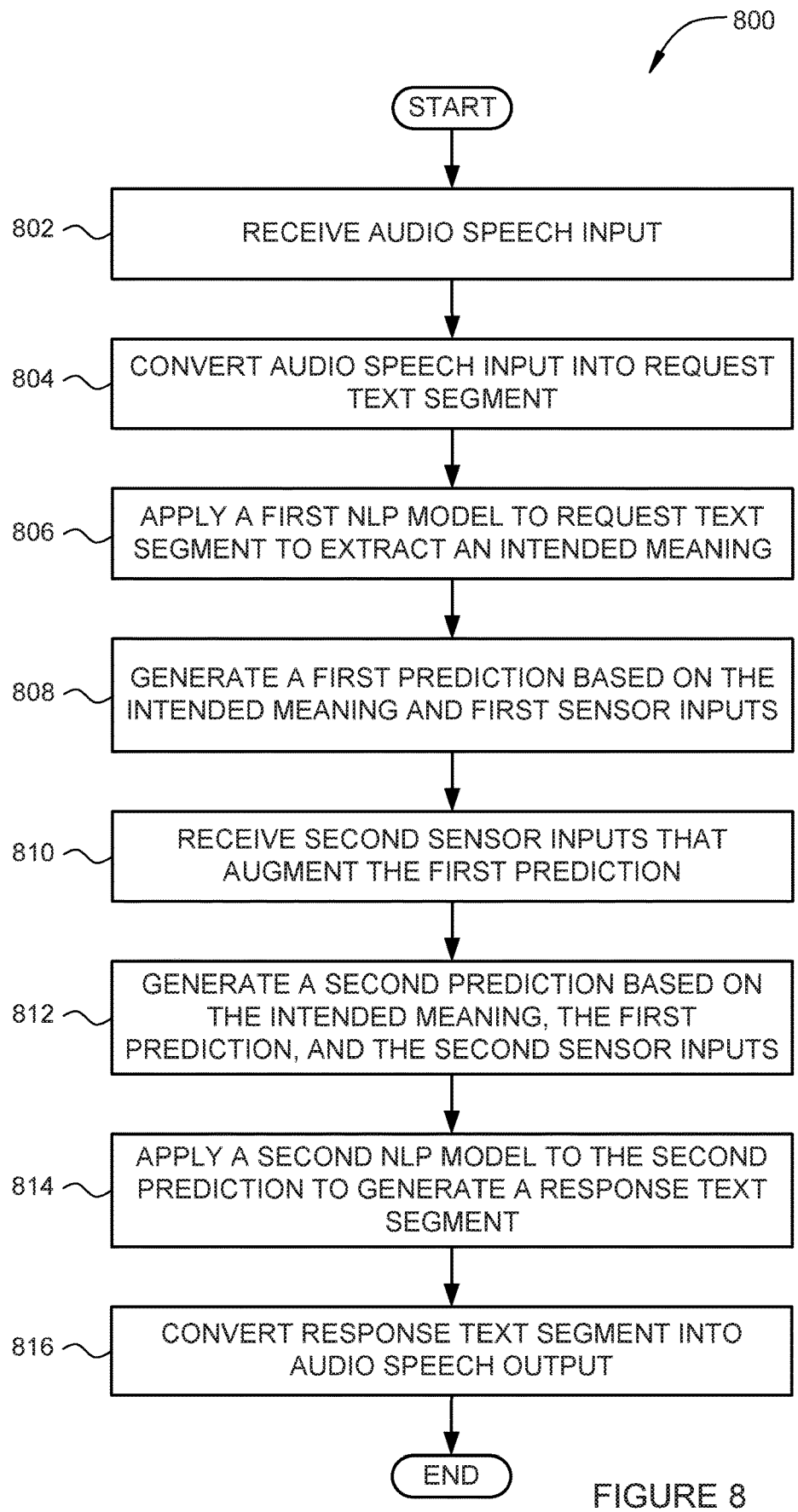
FIG. 8 is a flow diagram of method steps for performing an operation initiated by a user of a virtual personal assistant system, according to various embodiments.

FIG. 8 is a flow diagram of method steps for performing an operation initiated by a user of a virtual personal assistant system, such as the virtual personal assistant system 101, according to various embodiments. Although the method steps are described in conjunction with the systems of FIGS. 1-7, persons skilled in the art will understand that any system configured to perform the method steps, in any order, is within the scope of the present disclosure.

As shown, a method 800 begins at step 802, where a virtual personal assistant system 101 receives an audio speech input 802 from a user in the form of sound waves received via audio input device 114. At step 804, virtual personal assistant system 101 converts the audio speech input into a text segment. At step 806, virtual personal assistant system 101 applies a first NLP model to the text segment to extract an intended meaning. More particularly, virtual personal assistant system 101 analyzes the text segment to generate an extracted meaning that represents a meaning or intent of the user who uttered the words represented by the text segment.

At step 808, virtual personal assistant system 101 generates a first prediction based on the intended meaning and first sensor inputs. The first sensor inputs may include without limitation, camera data, infrared data, radar data, thermal sensor data, or any other technically feasible sensor data. At step 810, virtual personal assistant system 101 receives second sensor inputs that augment the first prediction. The second sensor inputs may include without limitation, camera data, infrared data, radar data, thermal sensor data, or any other technically feasible sensor data. In some embodiments, virtual personal assistant system 101 may select the second sensor based on the intended meaning. At step 812, virtual personal assistant system 101 generates a second prediction based on the intended meaning, the first prediction, and the second sensor inputs. At step 814, virtual personal assistant system 101 applies a second NLP model to the second prediction to generate a natural language response text segment. At step 816, virtual personal assistant system 101 converts the response text segment into an audio speech output, which is then transmitted to the user(s). In some embodiments, virtual personal assistant system 101 may incorporate information derived from the second sensor inputs into the natural language audio speech output. The method 800 then terminates.

Figure 9:
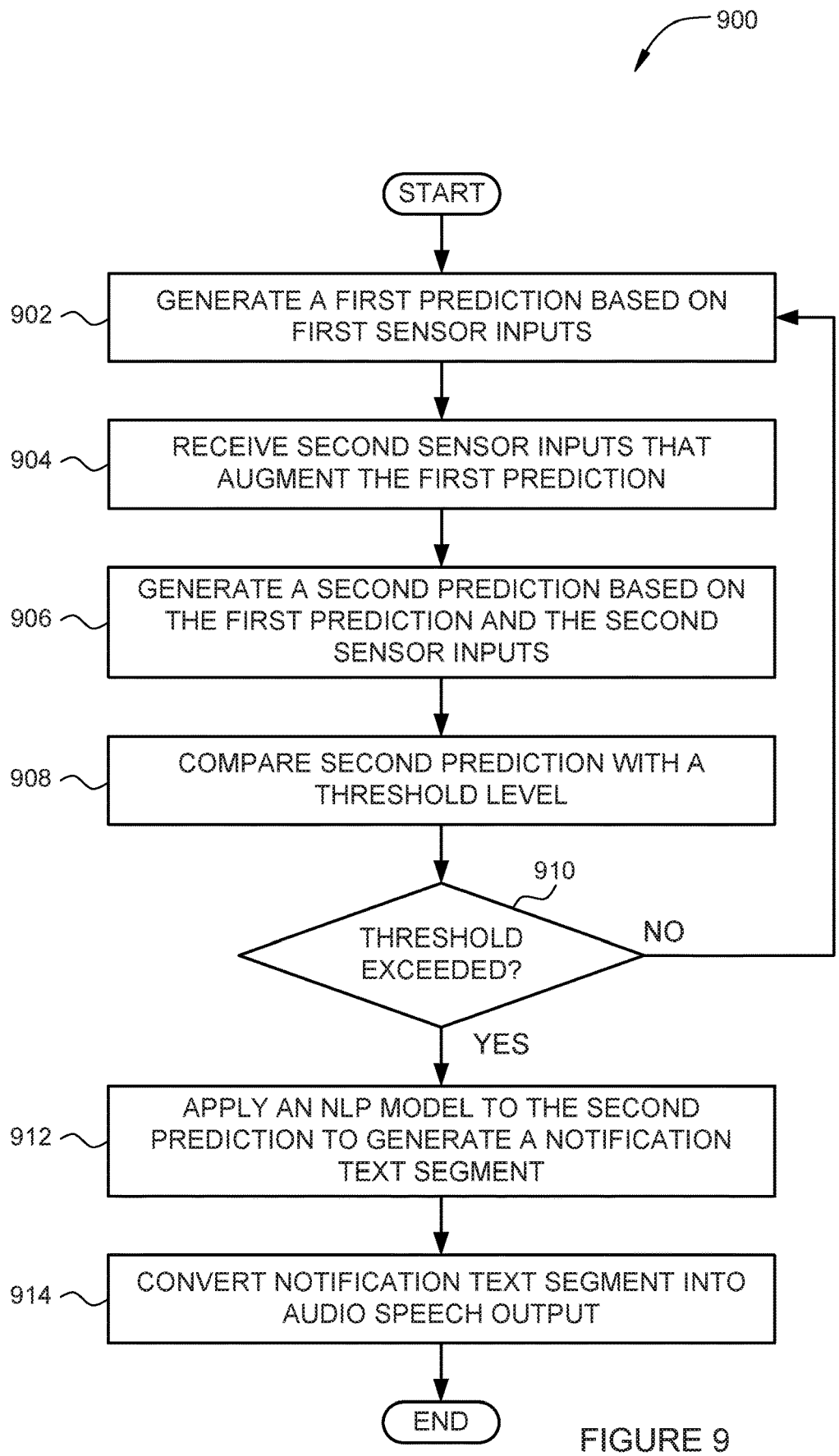
FIG. 9 is a flow diagram of method steps for performing an operation initiated by a virtual personal assistant system, according to various embodiments.

FIG. 9 is a flow diagram of method steps for performing an operation initiated by a virtual personal assistant system, such as the virtual personal assistant system 101, according to various embodiments. Although the method steps are described in conjunction with the systems of FIGS. 1-7, persons skilled in the art will understand that any system configured to perform the method steps, in any order, is within the scope of the present disclosure.

As shown, a method 900 begins at step 902, where a virtual personal assistant system 101 generates a first prediction based on first sensor inputs. The first sensor inputs may include without limitation, camera data, infrared data, radar data, thermal sensor data, or any other technically feasible sensor data. At step 904, virtual personal assistant system 101 receives second sensor inputs that augment the first prediction. The second sensor inputs may include without limitation, camera data, infrared data, radar data, thermal sensor data, or any other technically feasible sensor data. In some embodiments, virtual personal assistant system 101 may determine that the second sensor accesses data that augments an aspect of the first prediction and, in response, may select the second sensor based on the first result. At step 906, virtual personal assistant system 101 generates a second prediction based on the first prediction, and the second sensor inputs.

At step 908, virtual personal assistant system 101 compares the second prediction with a threshold level. At step 910, virtual personal assistant system 101 determines whether the second prediction exceeds the threshold level. If the second prediction does not exceed the threshold level, then the method 900 proceeds to step 902, described above. If, on the other hand, the second prediction exceeds the threshold level, then the method 900 proceeds to step 912, where virtual personal assistant system 101 applies an NLP model to the second prediction to generate a natural language notification text segment, such as an alert or notification. At step 914, virtual personal assistant system 101 converts the response text segment into an audio speech output, which is then transmitted to the user(s). In some embodiments, virtual personal assistant system 101 may incorporate information derived from the second sensor inputs into the natural language audio speech output. The method 900 then terminates.

In sum, a two-way virtual personal assistant system enables a user to interact with a virtual personal assistant to obtain information about an area, such as a vehicle and the surrounding environment or a home and the surrounding environment, monitored by one or more sensors. In assistant-to-user interactions, the two-way virtual personal assistant detects one or more states in the area monitored by the sensors and alerts the user regarding the detected states. More specifically, the virtual personal assistant module receives sensor data from one or more sensors and determines a state based on the sensors data. The virtual personal assistant module automatically generates an output, such as a speech output, based on the state (e.g., if the state is abnormal, if the state exceeds a threshold, etc.).

In user-to-assistant interactions, the virtual personal assistant receives a speech event via one or more microphones. The virtual personal assistant determines a request based on the speech event and determines a response to the request based on sensor data obtained from one or more sensors. The virtual personal assistant further generates an output, such as natural language speech output, based on the response to the request.

At least one technical advantage of the disclosed techniques relative to the prior art is that the disclosed techniques enable a virtual personal assistant to continuously monitor sensor data and other data sources and, in response, to proactively notify a user of certain conditions based on this data. Another advantage of the disclosed techniques is that, because the virtual personal assistant has access to a rich variety of sensor data and other data sources, the virtual personal assistant generates notifications with improved accuracy and thoroughness relative to conventional approaches. These technical advantages represent one or more technological advancements over prior art approaches.

1. In some embodiments, a computer-implemented method for interacting with a user comprises: obtaining first sensor data from a first sensor included in a plurality of sensors; analyzing the first sensor data to generate a first result; obtaining second sensor data from a second sensor included in the plurality of sensors; analyzing the second sensor data and the first result to generate a second result; and outputting a natural language audio output to the user based on the second result.

2. The computer-implemented method according to clause 1, wherein the first sensor data comprises audio speech input, and the method further comprises: converting the first sensor data into a text segment; applying a natural language processing model to the text segment to extract an intended meaning; and selecting the second sensor based on the intended meaning.

3. The computer-implemented method according to clause 1 or clause 2, further comprising incorporating the second sensor data into the natural language audio output.

4. The computer-implemented method according to any of clauses 1-3, further comprising: comparing the second result to a threshold level; and determining that the second result exceeds the threshold level, wherein outputting the natural language audio output is based on the determination that the second result exceeds the threshold level.

5. The computer-implemented method according to any of clauses 1-4, further comprising: applying a natural language processing model to the second result to generate a text segment; and converting the text segment into the natural language audio output.

6. The computer-implemented method according to any of clauses 1-5, further comprising: altering at least one of the first sensor data or the second sensor data to obscure identifying information associated with the user; and transmitting the at least one of the first sensor data or the second sensor data to a remote server for analysis.

7. The computer-implemented method according to any of clauses 1-6, further comprising: establishing communications with a smart device; and receiving at least one of the first sensor data or the second sensor data from the smart device.

8. The computer-implemented method according to any of clauses 1-7, further comprising: establishing communications with a smart device; and transmitting the natural language audio output to the smart device.

9. The computer-implemented method according to any of clauses 1-8, further comprising: determining that the second result is indicative of a life-threatening event; and assuming autonomous control of a vehicle associated with the user.

10. The computer-implemented method according to any of clauses 1-9, wherein at least one of the first result or the second result is a detection of an object outside of a vehicle associated with the user, and the natural language audio output indicates at least one of a direction and a distance between the vehicle and the object.

11. The computer-implemented method according to any of clauses 1-10, wherein at least one of the first result or the second result is a detection that a vehicle associated with the user is approaching a red light or a stop sign, and the method further comprises applying a braking function to stop the vehicle.

12. The computer-implemented method according to any of clauses 1-11, further comprising: determining that the second sensor accesses data that augments an aspect of the first result; and selecting the second sensor based on the first result.

13. In some embodiments, one or more computer-readable storage media include instructions that, when executed by one or more processors, cause the one or more processors to interact with a user, by performing the steps of: obtaining first sensor data from a first sensor included in a plurality of sensors; analyzing the first sensor data to generate a first prediction; obtaining second sensor data from a second sensor included in the plurality of sensors; analyzing the second sensor data and the first prediction to generate a second prediction; and outputting a natural language audio output to the user based on the second prediction.

14. The one or more computer-readable storage media according to clause 13, wherein the first sensor data comprises audio speech input, and the instructions further cause the one or more processors to perform the steps of: converting the first sensor data into a text segment; applying a natural language processing model to the text segment to extract an intended meaning; and selecting the second sensor based on the intended meaning.

15. The one or more computer-readable storage media according to clause 13 or clause 14, wherein the instructions further cause the one or more processors to perform the step of incorporating the second sensor data into the natural language audio output.

16. The one or more computer-readable storage media according to any of clauses 13-15, wherein the instructions further cause the one or more processors to perform the steps of: comparing the second prediction to a threshold level; and determining that the second prediction exceeds the threshold level, wherein outputting the natural language audio output is based on the determination that the second prediction exceeds the threshold level.

17. The one or more computer-readable storage media according to any of clauses 13-16, wherein the instructions further cause the one or more processors to perform the steps of: applying a natural language processing model to the second prediction to generate a text segment; and converting the text segment into the natural language audio output.

18. The one or more computer-readable storage media according to any of clauses 13-17, wherein the instructions further cause the one or more processors to perform the steps of: determining that the second sensor accesses data that augments an aspect of the first prediction; and selecting the second sensor based on the first prediction.

19. In some embodiments, a system comprises: a memory that includes instructions; and a processor that is coupled to the memory and, when executing the instructions: obtains first sensor data from a first sensor included in a plurality of sensors; analyzes the first sensor data to generate a first result; obtains second sensor data from a second sensor included in the plurality of sensors; analyzes the second sensor data and the first result to generate a second result; and outputs a natural language alert to the user based on the second result.

20. The system according to clause 19, wherein the processor, when executing the instructions, further incorporates the second sensor data into the natural language alert.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for interacting with a user, the method comprising:
utilizing a processor associated with a virtual personal assistance system, wherein the processor is configured to:
obtain first sensor data from a first sensor included in a plurality of sensors, the first sensor data including visual data;
analyze the first sensor data using a first deep learning model to generate a first prediction value;
obtain second sensor data from a second sensor included in the plurality of sensors, the second sensor data including at least one of audio data, temperature data, or biological data;
analyze the second sensor data using a second deep learning model that is different from the first deep learning model to generate a second prediction value;
aggregate the first prediction value with the second prediction value to determine an aggregate prediction value; and
output, via an audio output device, a natural language audio output to the user based on the aggregate prediction value.

2. The computer-implemented method of claim 1, wherein the first sensor data comprises audio speech input, and the processor is further configured to:
   convert the first sensor data into a text segment;
   apply a natural language processing model to the text segment to extract an intended meaning; and
   generate the first prediction value based on the intended meaning.

3. The computer-implemented method of claim 1, wherein the processor is further configured to incorporate the first sensor data or the second sensor data into the natural language audio output.

4. The computer-implemented method of claim 1, wherein the aggregate prediction value is a numerical value, and the processor is further configured to:
   compare the aggregate prediction value to a threshold level;
   determine that the aggregate prediction value exceeds the threshold level; and
   output the natural language audio output in response to the determination that the aggregate prediction value exceeds the threshold level.

5. The computer-implemented method of claim 1, wherein the processor is further configured to:
   apply a natural language processing model to the aggregate prediction value to generate a text segment; and
   convert the text segment into the natural language audio output.

6. The computer-implemented method of claim 1, wherein the processor is further configured to:
   alter at least one of the first sensor data or the second sensor data to obscure identifying information associated with the user; and
   transmit the at least one of the first sensor data or the second sensor data to a remote server for analysis.

7. The computer-implemented method of claim 1, wherein the processor is further configured to:
   establish communications with a smart device; and
   receive at least one of the first sensor data or the second sensor data from the smart device.

8. The computer-implemented method of claim 1, wherein the processor is further configured to:
   establish communications with a smart device; and
   transmit the natural language audio output to the smart device.

9. The computer-implemented method of claim 1, wherein the processor is further configured to:
   determine that the aggregate prediction value is indicative of a life-threatening event; and
   assume autonomous control of a vehicle associated with the user.

10. The computer-implemented method of claim 1, wherein:
    at least one of the first prediction value or the second prediction value is a detection of an object outside of a vehicle associated with the user, and
    the natural language audio output indicates at least one of a direction or a distance between the vehicle and the object.

11. The computer-implemented method of claim 1, wherein:
    at least one of the first prediction value or the second prediction value is a detection that a vehicle associated with the user is approaching a red light or a stop sign, and
    the processor is further configured to activate a braking function to stop the vehicle.

12. The computer-implemented method of claim 1, wherein the processor is further configured to:
    determine that the second sensor accesses data that augments the first prediction value; and
    select the second sensor based on the first prediction value.

13. One or more non-transitory computer-readable storage media including instructions that, when executed by one or more processors, cause the one or more processors to interact with a user, by performing the steps of:
    obtaining first sensor data from a first sensor included in a plurality of sensors, the first sensor data including visual data;
    analyzing the first sensor data using a first deep learning model to generate a first prediction value;
    obtaining second sensor data from a second sensor included in the plurality of sensors, the second sensor data including at least one of audio data, temperature data, or biological data;
    analyzing the second sensor data using a second deep learning model that is different from the first deep learning model to generate a second prediction value;
    aggregating the first prediction value with the second prediction value to determine an aggregate prediction value; and
    outputting, via an audio output device, a natural language audio output to the user based on the aggregate prediction value.

14. The one or more non-transitory computer-readable storage media of claim 13, wherein the first sensor data comprises audio speech input, and the instructions further cause the one or more processors to perform the steps of:
    converting the first sensor data into a text segment;
    applying a natural language processing model to the text segment to extract an intended meaning; and
    generating the first prediction value based on the intended meaning.

15. The one or non-transitory more computer-readable storage media of claim 13, wherein the instructions further cause the one or more processors to perform the step of incorporating the first sensor data or the second sensor data into the natural language audio output.

16. The one or more non-transitory computer-readable storage media of claim 13, wherein the aggregate prediction value is a numerical value, and the instructions further cause the one or more processors to perform the steps of:
    comparing the aggregate prediction value to a threshold level;
    determining that the aggregate prediction value exceeds the threshold level; and
    outputting the natural language audio output in response to the determining that the aggregate prediction value exceeds the threshold level.

17. The one or more non-transitory computer-readable storage media of claim 13, wherein the instructions further cause the one or more processors to perform the steps of:
    applying a natural language processing model to the aggregate prediction value to generate a text segment; and
    converting the text segment into the natural language audio output.

18. The one or more non-transitory computer-readable storage media of claim 13, wherein the instructions further cause the one or more processors to perform the steps of:
    determining that the second sensor accesses data that augments the first prediction value; and selecting the second sensor based on the first prediction value.

19. A system, comprising:
a memory that includes instructions; and
a processor that is coupled to the memory and, when executing the instructions:
  obtains first sensor data from a first sensor included in a plurality of sensors, the first sensor data including visual data;
  analyzes the first sensor data using a first deep learning model to generate a first prediction value;
  obtains second sensor data from a second sensor included in the plurality of sensors, the second sensor data including at least one of audio data, temperature data, or biological data;
  analyzes the second sensor data using a second deep learning model that is different from the first deep learning model to generate a second prediction value;
  aggregates the first prediction value with the second prediction value to determine an aggregate prediction value; and
  outputs, via an audio output device, a natural language alert to a user based on the aggregate prediction value.

20. The system of claim 19, wherein the processor, when executing the instructions, further incorporates the first sensor data or the second sensor data into the natural language alert.

* * * * *